United States Patent [19]

Holz

[11] Patent Number: 5,371,590
[45] Date of Patent: Dec. 6, 1994

[54] RING LASER GYRO

[75] Inventor: Michael Holz, Newton Centre, Mass.

[73] Assignee: Raytheon Company, Lexington, Mass.

[21] Appl. No.: 412,401

[22] Filed: Aug. 27, 1982

[51] Int. Cl.$^5$ ............ G01B 9/02; G02F 1/09; H01S 3/083
[52] U.S. Cl. ............ 356/350; 372/94
[58] Field of Search ............ 356/350; 372/94

[56] References Cited

U.S. PATENT DOCUMENTS

| | | | |
|---|---|---|---|
| 3,744,908 | 7/1973 | Podgorski | 356/350 |
| 4,158,821 | 6/1979 | Bresman | 372/88 |
| 4,329,057 | 5/1982 | Zampiello | 356/350 |
| 4,470,701 | 9/1984 | Smith | 372/94 |
| 4,481,635 | 11/1984 | Broberg et al. | 372/94 |

OTHER PUBLICATIONS

Technical Report AFWAL-TR-80-1174, "Ring Laser Gyro Technology for Advanced Aircraft Navigation (Phase II)", J. B. Matthews et al; Raytheon Company, Nov. 1980; pp. 48–60.

DTIC Technical Abstract Bulletin No. 81-18; Aug. 28, 1981; No. AD-B952 517; p. 35.
IEEE Journal of Quantum Electronics, vol. QE-4, No. 1, Jan. 1968 "Langmuir Flow Effects in the Laser Gyro" Ted J. Podgorski and Frederick Aronowitz, pp. 11–18.
Optical Engineering, vol. 18 No. 4, Jul.–Aug. 1979 "Dispersion and gas flow effects in the ring laser gyro" F. Aronowitz and W. L. Lim, pp. 376–380.
F. Aronwitz, "Single-Isotape Laser Gyro", Feb. 1972, pp. 405–412, Appl. Opt., vol. 11, #2.

Primary Examiner—Nelson Moskowitz
Attorney, Agent, or Firm—Walter F. Dawson

[57] ABSTRACT

A ring laser gyro uses a composition for the gain medium which optimizes the effect of the Fresnel-Fizeau drag on the output signal of the gyro. In one embodiment, a composition of the gain medium is used which produces no change in the Fresnel-Fizeau component of the output signal as the discharge current varies from a nominal amount. In another embodiment, a gain medium composition is used which eliminates the Fresnel-Fizeau component of the output signal at a predetermined level of discharge current.

5 Claims, 3 Drawing Sheets

RING LASER GYRO

The Government has rights in this invention pursuant to Contract No. F33615-79-C-1766 awarded by the Department of the Air Force.

BACKGROUND OF THE INVENTION

Ring laser gyros use two counter-propagating beams of predetermined frequencies to measure the rotation rate about the sensitive axis of the ring as a function of the difference in frequency, i.e. the beat frequency, between the counter-propagating beams. The means normally used to produce such counter-propagating beams usually comprise an electric DC discharge in a gain medium, such as a suitable mixture of Helium and Neon. The electrical discharge gives rise to the so-called wall effect first explained by Langmuir. The discharge results in a negatively charged wall region which attracts positive neon ions but repels electrons. This causes an unbalanced electron pressure in that region which gives rise to a net force on the atoms of the gain medium which, in turn, drives a gas flow, customarily called Langmuir flow. Thus, in all presently known laser gyros, the gain medium is subject to a corresponding Langmuir flow. The interaction of the beams with the moving medium, normally referred to as the Fresnel-Fizeau drag, gives rise to a frequency shift of the counter-propagating beams, since the beam propagating in the direction of the flow sees an optical length which is different from that of the beam propagating in the direction opposite that of the flow. The flow then gives rise to a beat frequency between the counter-propagating beams which is not due to the rotation of the ring path, thus the output signal has a component which is normally referred to as the Fresnel-Fizeau bias. Present gyro configurations use two balanced electrical discharges in the two opposite directions in order to cancel the Fresnel-Fizeau bias. The main problem is that if the two electrical discharges are not perfectly balanced or if the two discharge bores are not perfectly matched, there is still a net bias due to the unbalanced Fresnel-Fizeau drag.

SUMMARY OF THE INVENTION

The invention provides for a ring laser gyro having a gain medium composition which optimizes the effect of the Fresnel-Fizeau drag on the output signal of the gyro. In one embodiment, the laser gyro uses a gain medium composition which produces substantially no change in the Fresnel-Fizeau component of the output signal as the current, which is used to produce the counter-propagating beams, varies from its nominal value. In another embodiment, the laser gyro uses a gain medium composition which substantially eliminates the Fresnel-Fizeau component of the output signal for a predetermined value of the discharge current.

BRIEF DESCRIPTION OF THE DRAWINGS

The present invention may be better understood with reference to the accompanying drawings wherein.

DESCRIPTION OF THE PREFERRED EMBODIMENT

Figure 1:
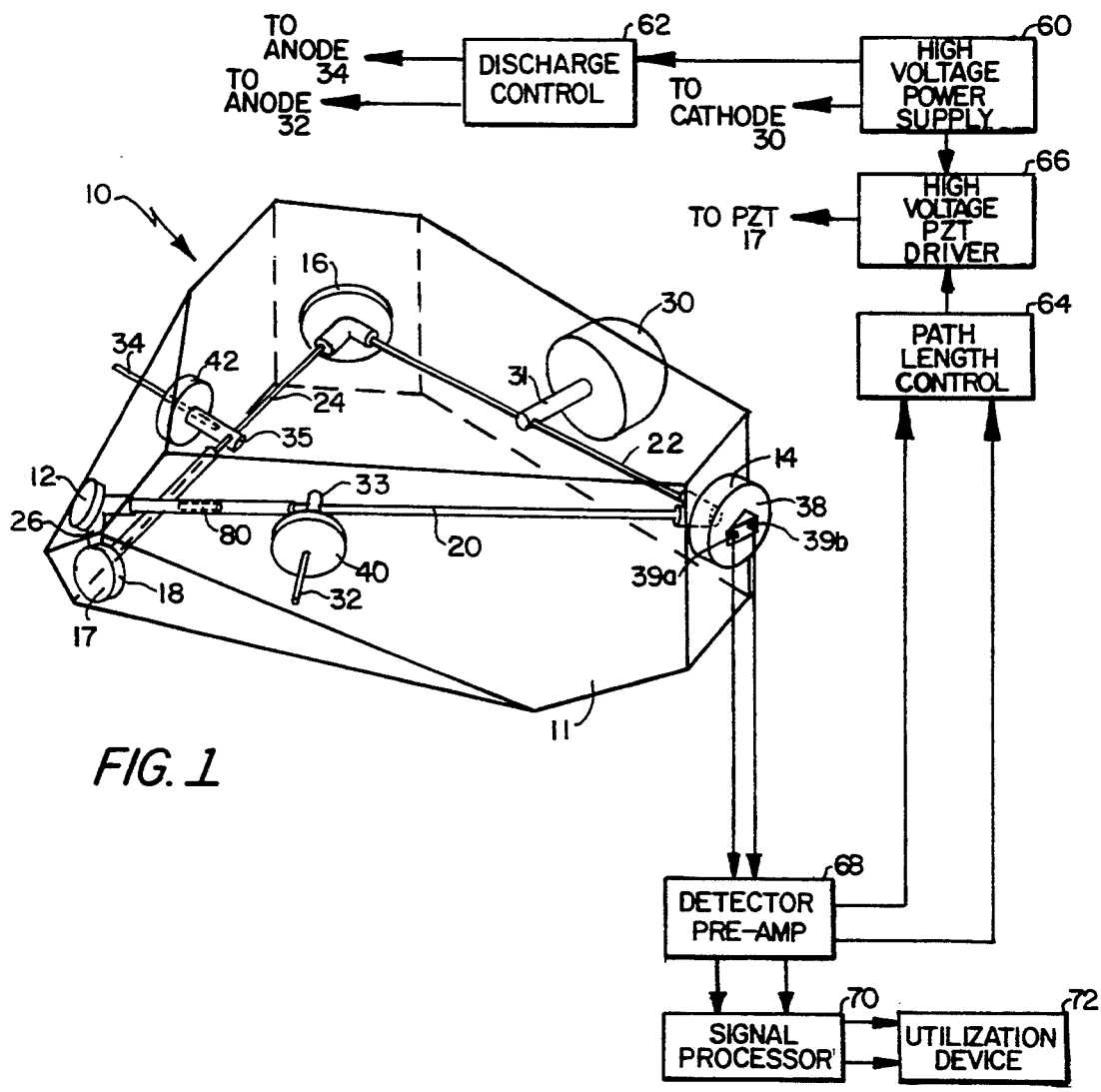
FIG. 1 is a partially diagrammatical view of the laser gyro system of the present invention.
Figure 2:
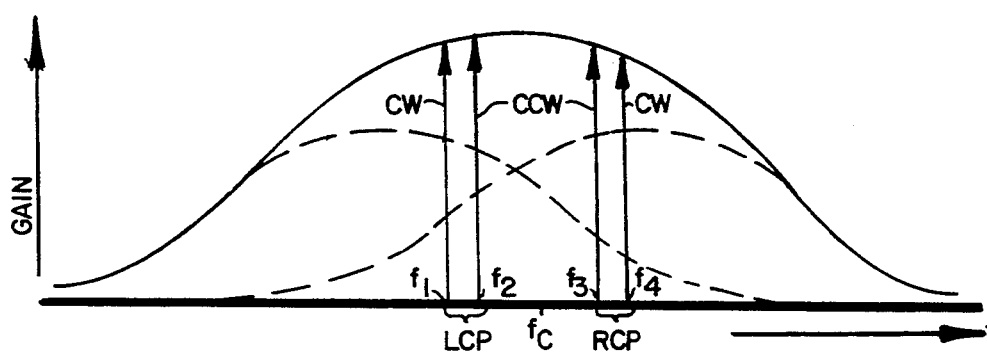
FIG. 2 shows the mode component distribution useful in understanding the operation of the laser gyro of the present invention.

Referring now to FIG. 1, there is shown the ring laser gyro system embodying the principles of the present invention. A ring path is produced in block 11 by mirrors 12, 14, 16 and 18 placed at respective surfaces of block 11. Passages 20, 22, 24 and 26 are cut into block 11 between mirrors 12, 14, 16 and 18 to provide a clear path and contain a gain medium suitable for procucing beams of predetermined frequency. The gain medium has a composition which is selected to produce an optimized amount of Fresnel-Fizeau drag, as will be explained in more detail hereinbelow. Beams of electromagnetic energy propagating in the path thus defined are produced by generating an electrical discharge in the gain medium, as is well known in the art. Such a discharge is produced between central cathode 30 and electrode 32 and 34 by high voltage power supply 60 and discharge control 62. In the preferred embodiment, the mirrors are positioned to produce a ring path having path segments in two intersecting planes. The resulting nonplanar resonant path produces an image rotation sufficient to provide a predetermined amount of reciprocal (direction-independent) circular birefringence to the beams circulating in such path. This forces the beams to be circularly polarized and to separate in frequency according to their polarization sense. This may be seen in FIG. 2 as the frequency splitting of a predetermined mode of frequency $f_c$ into a first component pair, comprising counter-propagating left-hand circularly polarized (LCP) frequency components $f_1$ and $f_2$, and a second component pair, comprising counter-propagating right-hand circularly polarized (RCP) frequency components $f_3$ and $f_4$. A more detailed description of such a circularly polarized gyro using a nonplanar path is found in U.S. Pat. No. 4,110,045 issued Aug. 29, 1978 to Smith, Jr. et al. and assigned to the present assignee. A nonreciprocal (direction-dependent) polarization rotation is provided by Faraday rotator 80, which is used to provide a frequency splitting, usually called Faraday bias, between counter-propagating components for each pair, i.e. between $f_1$ and $f_2$ of the LCP pair, and $f_3$ and $f_4$ of the RCP pair. Faraday rotator 80 comprises a plate of optical material and means, such as a permanent magnet, for producing a longitudinal magnetic field in the optical material. A more detailed description of a suitable Faraday rotator may be found in U.S. Pat. No. 4,284,329, issued to Aug. 18, 1981, to Irl W. Smith et al., and assigned to the present assignee.

One of the mirrors, for instance mirror 14, is made partially transmitting in order to extract the beams circulating in the ring path. Output optics 38 is formed on output mirror 14 and is used to combine the counter-propagating mode components and isolate each polarization on separate diodes, here shown as diodes 39a and 39b, in order to detect the beat frequencies between the counter-propagating mode components for each polarization, i.e. $(f_2-f_1)$ and $(f_4-f_3)$. The two resulting signals are preamplified in preamp 68 before being fed to signal processor 70 where an output signal indicative of the rotation rate is generated, for instance, by subtracting one beat frequency from the other to remove the Faraday bias. The output signal thus generated is then coupled to utilization device 72 which may include a visual display or other operator interface. A more detailed description of suitable output optics 50 may be found in U.S. Pat. No. 4,141,651, issued Feb. 27, 1979 to Smith et al. and assigned to the present assignee.

The pathlength control feedback network uses the DC signal components available at preamplifier 68, which indicate the relative intensities of the circularly polarized mode components pairs. These DC signals are coupled to pathlength control 64 which produces an appropriate error signal as a function of the difference of their relative intensities. This is done to maintain the mode components corresponding to the two circularly polarized pairs, i.e. $f_1$ and $f_2$ for the LCP pair and $f_3$ and $f_4$ for the RCP pair, symmetrically within the bandwidth of the gain medium. The error signal produced by pathlength control 64 is then applied to piezoelectric driver 66 to produce a voltage signal which is applied to piezoelectric actuator 17. The voltage applied causes a corresponding contraction or expansion of the piezoelectric substrate, thus moving surfaces of mirror 18 in a direction which compensates for a contraction or expansion of the block circumference. A more detailed description of such a pathlength control is found in U.S. Pat. No. 4,108,553 issued Aug. 22, 1978, to Zampiello et al. and assigned to the present assignee.

Cathode 30 comprises a substantially spherical conductive envelope of a material suitable for the generation of free electrons. Cathode 30 is hermetically sealed to the center of one of the faces of block 11 adjacent passage 22. Cathode 30 is coupled to the ring path through auxiliary passage 31 which is drilled to intersect passage 22.

Anodes 32 and 34 each comprise a conductive electrode coupled to the ring path through auxiliary passages 33 and 35, respectively, drilled to intersect passages 20 and 24. The ends of electrodes 32 and 34 do not intersect passages 20 and 24, and stop a short distance therefrom. Electrodes 32 and 34 are held in place by seals 40 and 42 which prevent gain medium leakage.

The diameter of the inactive region of the passages, that is, the portion of passages 20, 24 and 26 between electrodes 32 and 34 on the opposite side from cathode 30, is of a size larger than the diameter of the active region, that is the portion of passages between the two electrodes 32 and 34 and cathode 30, to ease manufacturing tolerances and to reduce diffraction losses of the circulating beams.

Figure 3:
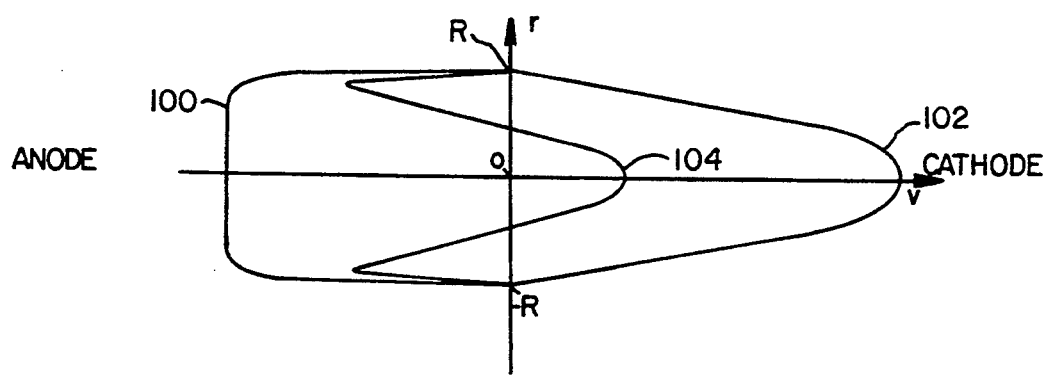
FIG. 3 shows the various gas flow velocity distributions as a function of radial position in the laser gyro tube between the anode and cathode.

The electric DC discharge used to produce the counter-propagating beams gives rise to the so-called Langmuir flow. This is shown in FIG. 3 as line 100. It may be explained as follows. In a Helium-Neon discharge, a small positive Neon-ion flow and a larger electron flow, which is due to the greater electron mobility, support the electric current. In the central region of the discharge passage, these forces on the gain medium are in equilibrium, and thus there is no net flow of the gas. The balance of forces no longer applies in the region near the wall of the discharge passage. In this region, the ions collide with the negatively charged wall, transferring all of their energy, while the electrons predominantly scatter elastically off the surface. Thus, in a sheath of thickness of the order of one ionic mean free path (MFP) at the wall, the unbalanced electron pressure exerts a net force on the atoms of the gas which drives a neutral gas flow from cathode to anode. The resulting flat top profile due to the wall effect is shown as line 100 in FIG. 3.

In the ring path of the gyro shown in FIG. 1, Faraday rotator plate 80 effectively blocks the passage, thus there cannot be any net gas circulation. This is similar to the case of a closed tube, and thus the wall effect leads to an increased gas pressure at the anode which induces a parabolic backflow from anode to cathode as indicated in FIG. 3 by line 102. The interaction of these two flows, i.e. their addition, results in the actual net flow, shown as line 104, in FIG. 3. Thus, the counter-propagating beams, normally travelling along the central portion of passages 20, 22, 24 and 26, interact with a moving medium. This causes the beam travelling in the direction of the flow to see a first optical length, while the beam travelling in the direction opposite of the flow sees a second, and different, optical length. There is then a frequency shift between counter-propagating beam components which is a function of the gas flow pattern. This frequency difference is detected and contributes a component, here called Fresnel-Frizeau drag bias, to the beat signal used as the rotation rate indicating signal.

As discussed in the Background, attempts at removing this bias have focussed at providing a balanced discharge, in order to set-up equal and opposite flow patterns which would cancel. The problem has been that perfectly equal discharge paths and perfectly balanced current are expensive and difficult to achieve. However, it has been found that the amount of bias due to the gas flow is a function of the composition of the gas mixture. This provides an additional degree of freedom in optimizing the bias.

To experimentally determine the effect of gas composition on the gyro bias, the gyro of FIG. 1 was operated by using only one of the two discharge legs, for example, by setting discharge control 62 to provide a current only to anode 32. This mode of operation displays the greatest sensitivity to Fresnel-Fizeau drag while maintaining the same type of gas flow pattern as shown in FIG. 3. The Fresnel-Fizeau drag depends on both block design, i.e. discharge bore diameter, and operating conditions, i.e. gas temperature, gas composition and discharge current. The data shown in FIGS. 4, 5 and 6 were taken with a gyro having a pathlength of 55 cm, a split discharge of length of 18.5 cm and a discharge bore diameter of 1.96 mm. For FIGS. 4 and 5, the nominal pressure was 2.5 Torr. This provided sufficient gain to operate on a single discharge with a variety of gas fills. The gas fill was changed with respect to the ratio of Helium to Neon atoms. To reduce the multitude of possibilities, the isotope mix for the neon, i.e. the ratio of $^{20}Ne$ to $^{22}Ne$, was kept at 1:1 throughout.

Figure 4:
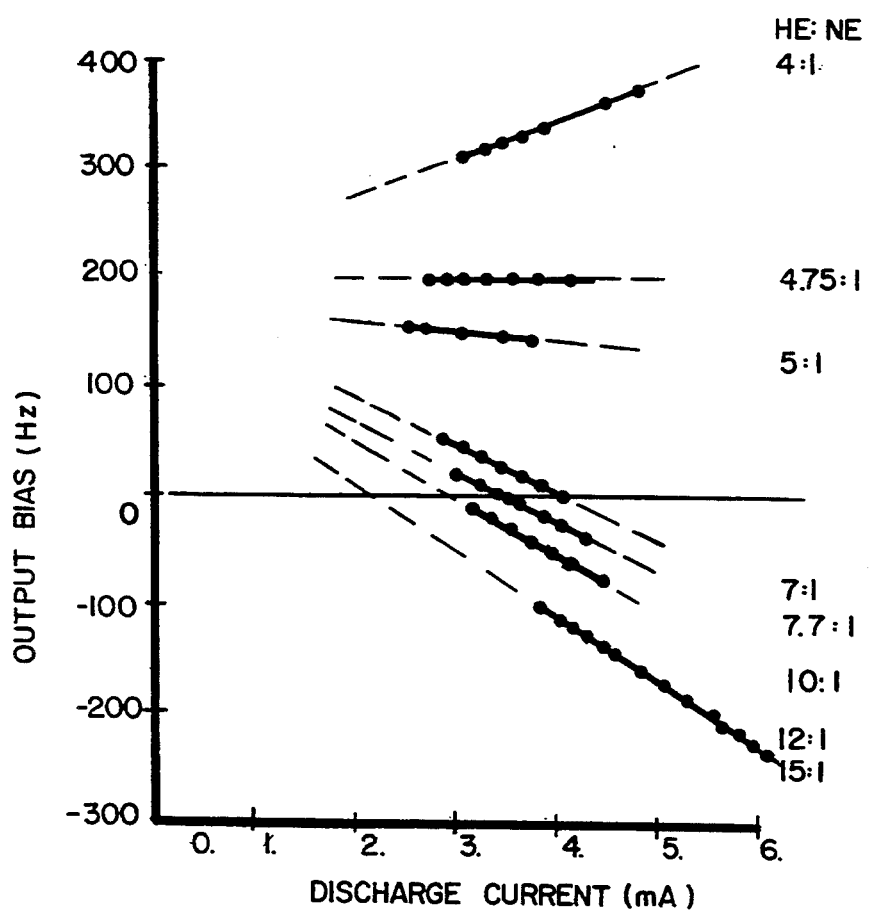
FIG. 4 shows the parametric family of curves that illustrate the effect of changing the gain medium composition on the Fresnel-Fizeau bias v. discharge current relationship.

Referring now to FIG. 4, there is shown a family of parametric curves showing how a change in the gas composition, which is normally regarded as a constant, affects the gyro bias component due to the Fresnel-Fizeau drag as a function of discharge current. The rotation component of the bias due to earth-rotation has been subtracted. The measured points can be fitted to a straight line for each gas fill. The linear relationship holds for the range of currents normally used. It can be seen that the slope db/dI of the curves changes sign as a function of gas fill. The slope is positive for a mixture rich in Neon such as 4:1, goes to zero for a fill near 4.75:1 and becomes more and more negative as the fill approaches 15:1.

Figure 5:
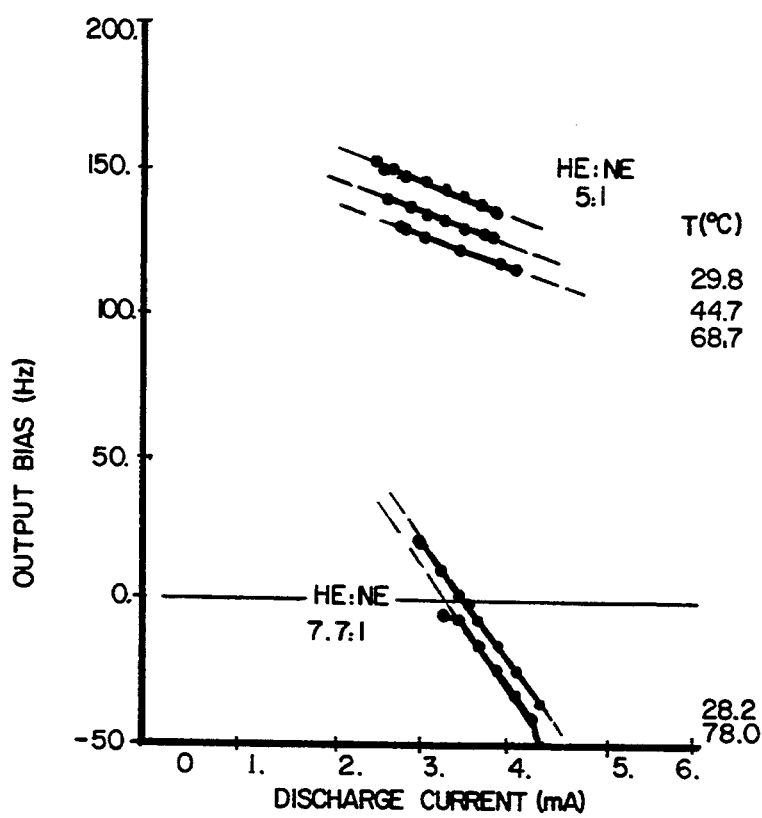
FIG. 5 shows the parametric family of curves that illustrate, for two different gain medium compositions, the effect of changing the temperature on the Fresnel-Fizeau bias v. discharge current relationship.
Figure 6:
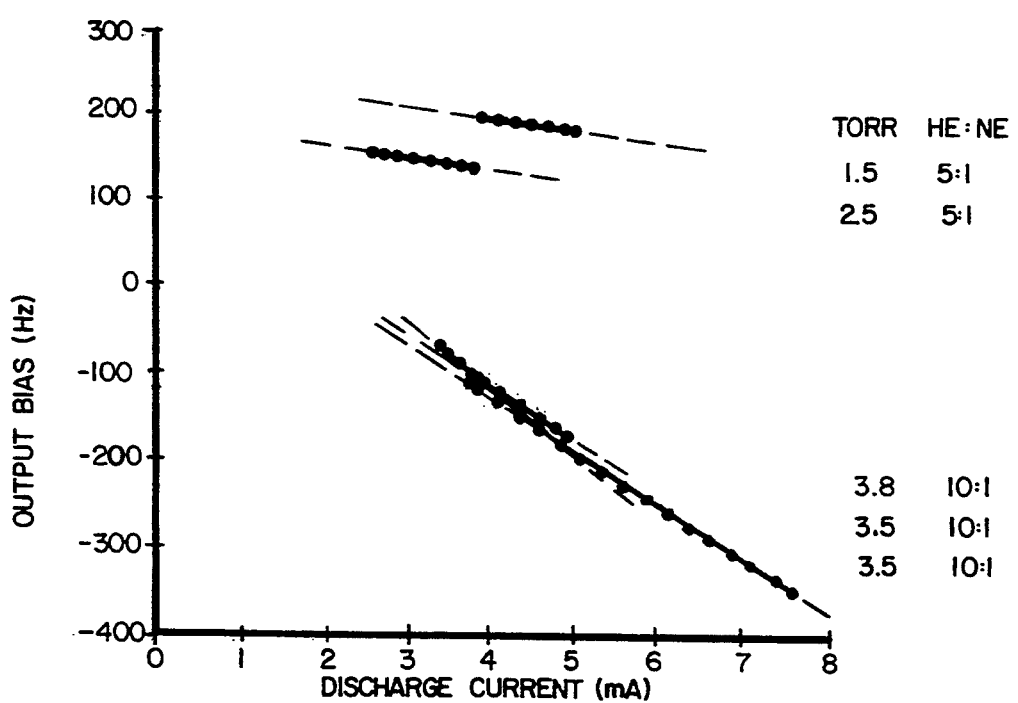
FIG. 6 shows the parametric family of curves that illustrate, for two different gain medium compositions, the effect of changing the pressure of the gain medium on the Fresnel-Fizeau bias v. discharge current relationship.

Referring now to FIG. 5, there is shown the parametric variation of temperature and its effect on the bias as a function of current for two specific gas fills. There is a small change in the gyro bias over the temperature range shown, however, the slope of the bias v. current curves remains substantially constant. For the 5:1 gas fill, the thermal sensitivity corresponds to 0.5 Hz/degree C., while for the 7.7:1 all the thermal sensitivity is only 0.2 Hz/degree C. Referring to FIG. 6, there is shown the dependency of the Fresnel-Fizeau bias v. current on the pressure. This is similar to the temperature dependence. In any event, these bias shifts cancel when both discharge legs are used in the normal split discharge mode of operation.

The experimental data thus found, can be used in the gyro of FIG. 1, to improve the operation of the balanced split discharge. This is done by selecting the zero-slope parametric curve to optimize the Fresnel-Fizeau bias component. In this case, a gas fill using a He to Ne ratio of 4.75:1 is selected. Since the slope of the bias as a function of current is zero for this gas fill, variations in the discharge current will not change the bias, thus decreasing the tolerance requirement on the current imbalance supplied by discharge control 62.

In an alternate embodiment, the operation of the gyro system of FIG. 1, is improved by using a gas mix for which a predetermined discharge current results in a zero Fresnel-Fizeau bias. For example, for a current of 3.5 mA, the gas fill having a ratio of 7.7:1 for He:Ne atoms is used. In this case, the Fresnel-Fizeau bias component is optimized by selecting one of the parametric curves with the zero bias intercept. This allows operation of a single discharge leg with no resulting bias, thus saving the need for a balanced discharge.

It should be understood that selection of the gas fill to optimize the bias v. current characteristics is not limited to the "closed tube" gas flow pattern resulting from the insertion of a Faraday rotator in the path of the flowing medium of a multiple oscillator type gyro described herein. The same relationship exists in the "open tube" type of gyro such as the current two-frequency gyros when they are operated with a balanced split discharge. In those cases, the gas flow pattern is as depicted by line 104 of FIG. 3. For single discharge operation with an "open tube", the gas flow pattern is as depicted by line 100 of FIG. 3. But in either case, families of similar parametric curves on isotope composition will be found.

Modifications to the described embodiments will be apparent to persons skilled in the art without departing from the spirit and scope of this invention. For example, while a nonplanar ring resonator has been described, a planar resonator may be used for a two-frequency gyro, or a crystal rotator may be used for a four-frequency circularly polarized gyro. Accordingly, it is intended that this invention be not limited except as defined by the appended claims.

What is claimed is:

1. A method of operating a ring laser gyro, wherein a discharge current is used in a gain medium to produce a beam of electromagnetic energy and an output signal is produced in response to rotation of the ring, the interaction of the beam with said discharge producing a bias component substantially in said output signal, comprising the step of:

selecting a gain medium whose composition produces a predetermined value of said bias component substantially independent of discharge current.

2. In combination:

means for providing a resonator; and means for producing a beam of electromagnetic energy comprising a gain medium and means for providing a discharge current in said gain medium, the interaction of said beam with said gain medium, the interaction of said beam with said discharge producing a frequency difference between beam components propagating in opposite directions, said gain medium having a composition which maintains said frequency difference substantially constant.

3. A ring laser gyro comprising:

means for providing a predetermined ring path;

means for producing counter-propagating beams in said path comprising a gain medium and means for generating a predetermined electrical current in said gain medium;

means for producing an output signal in response to rotation of said ring, the interaction of said beams with said current producing a bias component in said output signal; and said gain medium comprising a mixture having a composition which results in a constant bias component of output signal substantially independent of the amount of current.

4. The ring laser gyro of claim 3 wherein the current generating means produce a predetermined level of current distribution.

5. The ring laser gyro of claim 3 wherein the current generating means produce a balanced current distribution in said path.

* * * * *